US010417753B2

(12) United States Patent
Yoshida et al.

(10) Patent No.: US 10,417,753 B2
(45) Date of Patent: Sep. 17, 2019

(54) LOCATION IDENTIFYING DEVICE, LOCATION IDENTIFYING METHOD, AND PROGRAM THEREFOR

(71) Applicant: TOPCON CORPORATION, Itabashi-ku, Tokyo (JP)

(72) Inventors: Tsuyoshi Yoshida, Tokyo (JP); Noriko Saito, Tokyo (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 0 days.

(21) Appl. No.: 15/844,906

(22) Filed: Dec. 18, 2017

(65) Prior Publication Data

US 2018/0174290 A1 Jun. 21, 2018

(30) Foreign Application Priority Data

Dec. 21, 2016 (JP) .................................. 2016-247915

(51) Int. Cl.
*G06T 7/00* (2017.01)
*G06T 7/62* (2017.01)
*G06T 7/73* (2017.01)
*G06T 7/80* (2017.01)
*B64C 39/02* (2006.01)

(52) U.S. Cl.
CPC .......... *G06T 7/0002* (2013.01); *B64C 39/024* (2013.01); *G06T 7/62* (2017.01); *G06T 7/75* (2017.01); *G06T 7/80* (2017.01); *B64C 2201/123* (2013.01); *B64C 2201/127* (2013.01);

(Continued)

(58) Field of Classification Search
CPC ........ B64C 2201/127; B64C 2201/141; B64C 39/024; G06T 2207/10032; G06T 7/0002; G06T 7/62
See application file for complete search history.

(56) References Cited

U.S. PATENT DOCUMENTS

2004/0264763 A1* 12/2004 Mas ....................... G01C 23/00
382/154
2014/0119716 A1 5/2014 Ohtomo et al.
(Continued)

FOREIGN PATENT DOCUMENTS

JP 2014-089160 A1 5/2014

*Primary Examiner* — Anner N Holder
(74) *Attorney, Agent, or Firm* — Chiesa Shahinian & Giantomasi PC

(57) ABSTRACT

A location identifying device includes an image data receiving part that receives data of a photographed image of a field taken from the air, and a location data receiving part that receives data of location, which is measured on the basis of navigation signals from a navigation satellite by a location measuring device while a mobile body having the location measuring device moves along a predetermined path set for the field. The location identifying device also includes a first shape data detecting part that detects a shape of the predetermined path from the photographed image data, a correspondence relationship determining part that determines a correspondence relationship between the shape of the path detected by the first shape data detecting part and the location data, and a field location identifying part that identifies a location of the field contained in the photographed image by referring to the determined correspondence relationship.

9 Claims, 5 Drawing Sheets

(52) U.S. Cl.
CPC .................. *B64C 2201/141* (2013.01); *G06T 2207/10032* (2013.01); *G06T 2207/30188* (2013.01)

(56) References Cited

U.S. PATENT DOCUMENTS

2016/0029545 A1* 2/2016 Matthews ............ A01B 69/008
             701/28
2018/0143634 A1* 5/2018 Ott ....................... G05D 1/0088

* cited by examiner

LOCATION IDENTIFYING DEVICE, LOCATION IDENTIFYING METHOD, AND PROGRAM THEREFOR

CROSS-REFERENCE TO RELATED APPLICATION

This application is based upon and claims the benefit of priority from Japanese Patent Application No. 2016-247915, filed Dec. 21, 2016, the entire contents of which are incorporated herein by reference.

TECHNICAL FIELD

The present invention relates to a technique for image measurement.

BACKGROUND

Techniques for image measurement of agricultural land are publicly known (for example, refer to Japanese Unexamined Patent Application Laid-Open No. 2014-089160). These techniques perform aerial photographing of agricultural land using an aircraft. The image measurement using aerial photographs requires ortho correction. To perform the ortho correction, data of parts that are easily recognizable in the aerial photographs (for example, curbs or white lines on roads, or manholes) or location data of targets, is necessary.

SUMMARY

Surveying performed prior to the above-described photographing from the air consumes time and labor and is therefore not practical. In view of these circumstances, an object of the present invention is to provide a technique enabling easy identification of locations in aerial photogrammetry.

A first aspect of the present invention provides a location identifying device including an image data receiving part, a location data receiving part, a path detecting part, a correspondence relationship determining part, and a field location identifying part. The image data receiving part receives data of a photographed image of a field taken from the air. The location data receiving part receives data of location, and the data of the location is measured on the basis of navigation signals from a navigation satellite by a location measuring device while a mobile body mounted with the location measuring device moves along a predetermined path set for the field. The path detecting part detects a shape of the predetermined path from the data of the photographed image. The correspondence relationship determining part determines a correspondence relationship between the shape of the path detected by the path detecting part and the data of the location. The field location identifying part identifies a location of the field contained in the photographed image by referring to the determined correspondence relationship.

According to a second aspect of the present invention, in the first aspect of the present invention, the path detecting part may detect movement tracks left by the mobile body.

According to a third aspect of the present invention, in the first or the second aspect of the present invention, the correspondence relationship may be determined by referring to a correspondence relationship between a condition of the field measured in the photographed image and a condition of the field preliminarily obtained. According to a fourth aspect of the present invention, in the third aspect of the present invention, the condition of the field may include a growing condition of agricultural crops that differs in each area of the field.

A fifth aspect of the present invention provides a location identifying device including an image data receiving part, a field condition data storage, a field condition measuring part, a correspondence relationship determining part, and a field location identifying part. The image data receiving part receives data of a photographed image of a field taken from the air. The field condition data storage stores data of a preliminarily obtained condition of at least one of soil and vegetation of the field, in association with data of location of the field. The field condition measuring part measures a condition of the soil or the vegetation of the field by using data of surface characteristics obtained from the photographed image. The correspondence relationship determining part obtains a correspondence relationship between the data stored in the field condition data storage and the data of the condition of at least one of the soil and the vegetation of the field, which is measured by the field condition measuring part. The field location identifying part identifies a location of the field that is photographed from the air, by referring to the obtained correspondence relationship.

According to a sixth aspect of the present invention, in the fifth aspect of the present invention, the data of the surface characteristics may contain one or multiple pieces of data of wavelength spectrum, color, texture, pattern, and form.

According to a seventh aspect of the present invention, in the fifth or the sixth aspect of the present invention, the field may have multiple areas that have conditions different from each other. In this case, the field condition data storage may store the combination of the multiple areas. The field condition measuring part may detect the combination of the multiple areas by using the data of the photographed image. The correspondence relationship determining part may determine a correspondence relationship between the combination stored in the field condition data storage and the combination detected by the field condition measuring part.

According to an eighth aspect of the present invention, in any one of the fifth to the seventh aspects of the present invention, the multiple areas may include multiple sites with vegetation that differ from each other. In this case, the field condition measuring part may detect identification information of the field corresponding to the respective vegetation by using the data of the surface characteristics corresponding to the multiple areas obtained from the photographed image.

A ninth aspect of the present invention provides a location identifying method including receiving data of a photographed image of a field taken from the air and receiving data of location. The data of the location is measured on the basis of navigation signals from a navigation satellite by a location measuring device while a mobile body mounted with the location measuring device moves along a predetermined path set for the field. The method also includes detecting a shape of the predetermined path from the data of the photographed image, determining a correspondence relationship between the shape of the path detected by the path detecting part and the data of the location, and identifying a location of the field contained in the photographed image by referring to the determined correspondence relationship.

A tenth aspect of the present invention provides a non-transitory computer recording medium storing computer executable instructions that, when executed by a computer processor, cause the computer processor to: receive data of a photographed image of a field taken from the air, receive data of location that is measured on the basis of navigation signals from a navigation satellite by a location measuring device while a mobile body mounted with the location measuring device moves along a predetermined path set for the field, detect a shape of the predetermined path from the data of the photographed image, determine a correspondence relationship between the shape of the path detected by the path detecting part and the data of the location, and identify a location of the field contained in the photographed image by referring to the determined correspondence relationship.

The present invention enables more easy identification of location in aerial photogrammetry.

BRIEF SUMMARY OF THE EMBODIMENTS

Exemplary embodiments describe a technique for obtaining a correspondence relationship between aerial photographs of a farm and coordinate data (data of longitude and latitude and data of altitude) of a sectioned area of the farm (hereinafter described as a "field"). The farm (field) as used herein may be a farm before agricultural crops are planted or a farm after agricultural products are planted (are being cultivated). The aerial photographs can be taken by any type of aircraft that can take photographs from the air.

Such an aircraft includes an unmanned aerial vehicle (UAV). The UAV includes one that is wirelessly controlled, one that flies autonomously, and one that can be wirelessly controlled and can fly autonomously. The UAV used here is mounted with a location identifying device (called a "GPS receiver") using a global navigation satellite system (GNSS), an inertial measurement unit (IMU), an altimeter, and a camera, and the UAV photographs the ground in flight along a predetermined path. The UAV can also fly and photograph by wireless control. The camera takes still images. The photographing is performed at a predetermined time interval, a predetermined time, a timing instructed from a remote place, a timing triggered in response to information obtained from the GNSS or the IMU, or other timing. In some cases, moving images may be taken, and still images may be extracted from frame images composing the moving images to obtain aerial images.

The camera mounted on the UAV has a storage for storing data of photographed images, and the image data is retrieved from the storage after the flight is completed. The UAV may be mounted with a communication unit for image data, and the image data may be output via wireless communication.

The coordinate data of the field is obtained by a mobile body mounted with a location measuring device using a GNSS. A typical mobile body is a tractor, but an automotive apparatus may also be used. Any agricultural tractor can be used. The GNSS unit preferably has accuracy that is as high as possible.

Figure 1:
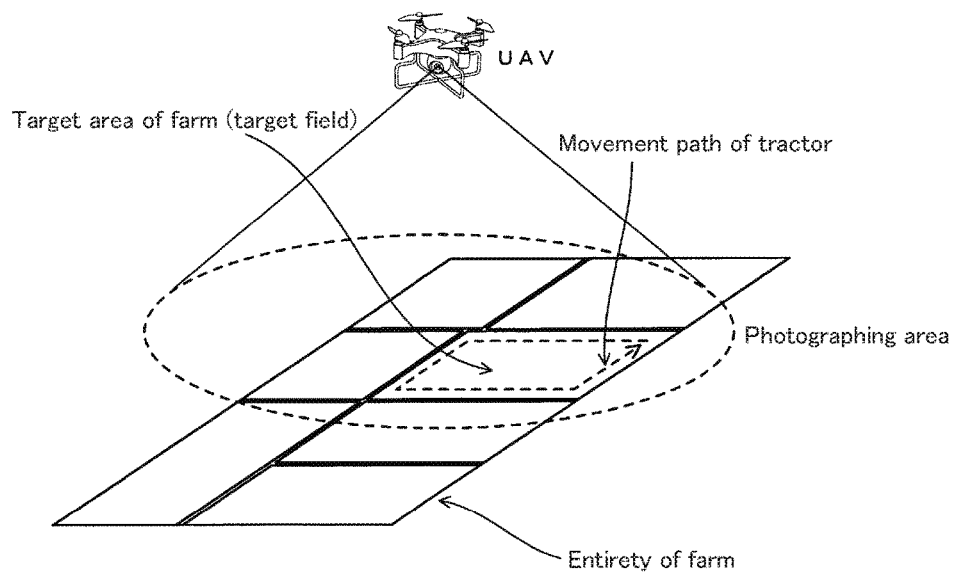
FIG. 1 is a conceptual diagram of an embodiment.

FIG. 1 conceptually shows a situation in which the UAV takes aerial photographs from the air of a farm having multiple sectioned fields after a tractor moves along edges of a field to be measured while a location measuring device obtains location data of the field by using a GNSS. Although FIG. 1 shows the UAV that flies by a rotor, the number of the rotors and the type of the flight principle are not particularly limited.

Figure 2:
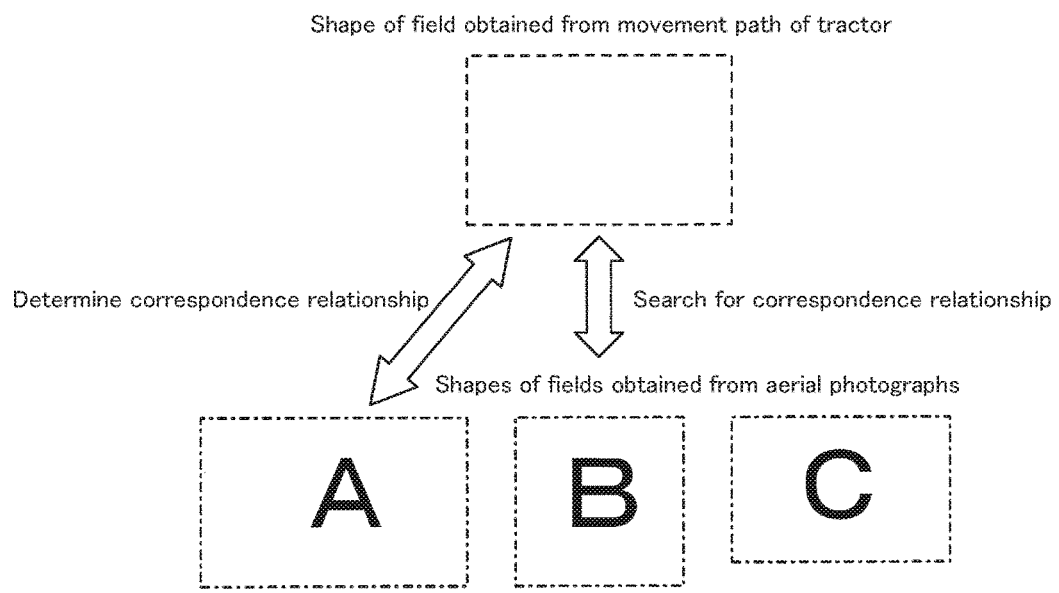
FIG. 2 is a conceptual diagram of an embodiment.

FIG. 2 conceptually shows a situation of examining a correspondence relationship between shape data of a movement path of a tractor (first shape data) and shape data of the fields (here, a field "A", a field "B", and a field "C") obtained from the aerial photographs. In this example, the tractor moving along the edges of the field leaves a path of its movement representing the shape of the field. Thus, in this example, (movement path of the tractor) =(outline shape of the field) =(first shape data).

In this example, a tractor (or an appropriate automotive agricultural apparatus) mounted with a location measuring device using a GNSS is made to move along edges of a target field, and location data is obtained at the same time. For example, for a rectangular target field, data of a movement path along the edges of a rectangular shape is obtained. On the basis of this movement path data of the tractor, the shape data of the target field (hereinafter called "first shape data") is obtained.

In addition to obtaining the location data of the field by the tractor, photographing of the target field from the air is performed by using the UAV to obtain aerial photographs of the target field. The photographing area may be set so that only the target field will be photographed or may be set so that multiple fields including the target field and adjacent fields will be photographed. The obtained aerial photographs are then image-analyzed to detect edges of the field, whereby shape data (second shape data) of the edges of the field is obtained.

Then, a correspondence relationship between the first shape data (shape data of the field measured by the location measuring device mounted on the tractor) and the second shape data (shape data of the field obtained from the aerial photographs) is determined by using a figure matching technique. As a result, the field contained in the aerial photographs is associated with the location data of the field.

Figure 3:
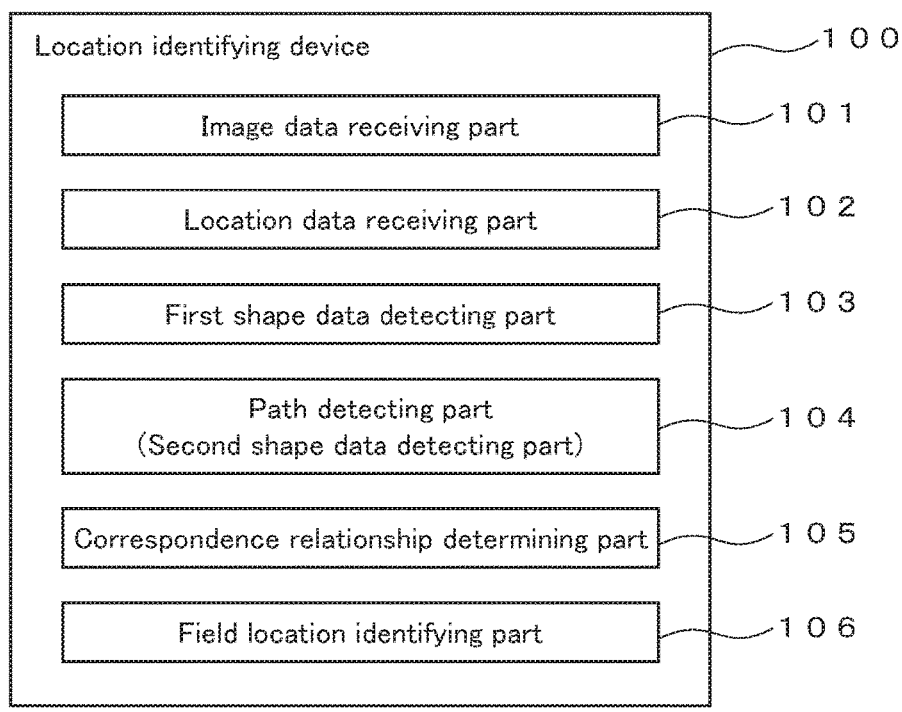
FIG. 3 is a block diagram of a location identifying device.

FIG. 3 shows a location identifying device 100 in accordance with an embodiment. The location identifying device 100 includes an image data receiving part 101, a location data receiving part 102, a first shape data detecting part 103, a path detecting part 104, a correspondence relationship determining part 105, and a field location identifying part 106. The location identifying device 100 is a computer having a CPU, a storage, and various interfaces, and it is constructed of dedicated hardware or a personal computer (PC). When a PC is used, application software for implementing functions of the above-described functional parts is installed in the PC and is operated so that the location identifying device 100 will be implemented by software by the PC.

When the PC is used, each functional part shown in FIG. 3 is constructed by software. A part or all of the functional parts shown in FIG. 3 may be respectively composed of dedicated arithmetic circuits. A functional part constructed of software and a functional part composed of a dedicated arithmetic circuit may be used together. For example, each of the functional parts shown in the drawing may be constructed of an electronic circuit such as a central processing unit (CPU), an application specific integrated circuit (ASIC), or a programmable logic device (PLD) such as a field programmable gate array (FPGA). Alternatively, a part of the functions may be constructed of dedicated hardware and be connected to a PC so as to configure the device shown in FIG. 3.

Whether each of the functional parts is to be constructed of dedicated hardware or is to be constructed of software so that programs are executed by a CPU is selected in consideration of necessary operating speed, cost, amount of electricity consumed, and other factors. Constructing the functional part by dedicated hardware and constructing the functional part by software are equivalent to each other from the viewpoint of obtaining a specific function. The above explanation also applies to the case of a location identifying device 200 shown in FIG. 5.

The image data receiving part 101 receives data of photographed images of fields taken from the air. That is, data of aerial images of a target field, which is photographed by the UAV mounted with the camera, is received by the image data receiving part 101. The location identifying device 100 and the camera mounted on the UAV are connectable to each other by USB connection or an appropriate communication channel such as a wireless LAN channel (normally, these channels are regularly equipped on a PC). The data is transferred from the camera for taking aerial images to the location identifying device 100 via such a communication channel. Normally, the data is transferred after the UAV ends its flight, but the data can also be transferred to the location identifying device 100 via wireless communication while the UAV is flying. Additionally, the data can also be transferred by using a storage medium such as a USB memory. The image data receiving part 101 executes the processing in step S103 shown in FIG. 4, which is described later.

The location data receiving part 102 receives location data. The location data is measured on the basis of navigation signals from a navigation satellite by a location measuring device while a tractor or another apparatus, which is mounted with the location identifying device, moves along a predetermined path set for the target field. For example, a tractor mounted with a location measuring device using a GNSS is prepared, and the tractor is made to move along the entire circumferential edge of a target field once. While moving, the location measuring device receives navigation signals from a navigation satellite of the GNSS and measures the location. In this measurement, location (longitude, latitude, and altitude) along the edges of the target field is measured, and location information of the movement path in a map coordinate system is obtained. The data of the location information of the movement path is received by the location data receiving part 102. The method of transferring this data from the tractor to the location identifying device 100 is the same as in the case of the data of the aerial images from the UAV. The location data receiving part 102 executes the processing in step S101 shown in FIG. 4, which is described later.

The first shape data detecting part 103 obtains data of the shape of the movement path as first shape data, on the basis of the location data. The location data is measured on the basis of the navigation signals from the navigation satellite by the location measuring device while the tractor moves along the predetermined path set for the target field. For example, when a rectangular path is passed, data of the rectangular shape is obtained. This path may be a path along edges of a field passed by the tractor or another apparatus, but the path is not particularly limited. For example, a path along a circle, a polygon, a cross, or other shape in a field may also be used. The movement may also be performed such that a person with a location measuring device using a handheld GNSS moves on foot. The first shape data detecting part 103 executes the processing in step S102 shown in FIG. 4, which is described later.

The path detecting part (second shape data detecting part) 104 detects data of the shape of the movement path of the tractor as second shape data from the data of the photographed images taken by the UAV. For example, when the tractor moves along edges of a field, the edges of the field are detected in the aerial images to obtain the shape of the movement path of the tractor as the second shape data. The shape data can be modified (corrected) by using data of tilt of the UAV (which is obtained from data of the IMU mounted on the UAV). The path detecting part 104 executes the processing in step S104 shown in FIG. 4, which is described later.

The path that can be detected as an image includes a boundary line of a piece of cultivated land, a raised foot path between fields, a farm road, a path or a track generated due to movement of a tractor or another apparatus, and a trail or a line of footprints generated by the walking of a person. The movement path of the tractor includes ruts of wheels or crawler belts, and marks left on the ground surface by agricultural tools equipped on (or coupled with) a tractor. For example, when a cultivator cultivates a field while moving, the soil where the cultivator passes is turned up and changes color, and therefore, the turned-up soil can be identified in the aerial photographs. In another example, the tractor may be equipped with a lining tool (a tool for drawing a white line with lime on an athletic field or other ground), and the tractor may be made to generate a line with lime while moving, to use the white line as a movement path.

The correspondence relationship determining part 105 determines a correspondence relationship between the first shape data detected by the first shape data detecting part 103 and the second shape data detected by the path detecting part 104. The correspondence relationship is determined by using a publicly known matching method. The matching method used here may be template matching. This matching method can use various types of algorithms that may be used in image recognition. The correspondence relationship determining part 105 executes the processing in step S105 shown in FIG. 4, which is described later.

The field location identifying part 106 identifies the location of the target field contained in the aerial images taken from the UAV, by referring to the correspondence relationship between the first shape data and the second shape data, which is determined by the correspondence relationship determining part 105. For example, a rectangular field may be contained in aerial images. In this case, location of edges of this field may be measured by a location measuring device that can measure location using a GNSS, which is mounted on a tractor. The result of measuring the location of the edges of the field by the tractor provides first shape data, and aerial images taken from the UAV provides second shape data. Then, the correspondence relationship determining part 105 determines a correspondence relationship between the first shape data, which is derived from the movement path of the tractor, and the second shape data, which is derived from the aerial images. According to the contents of the determined correspondence relationship, the first shape data and the second shape data are associated with each other.

The field location identifying part 106 obtains a relationship between images of the field contained in the aerial images and the location data of the field by referring to the correspondence relationship between the first shape data and the second shape data to identify the location (location in a map coordinate system, for example, longitude, latitude, and altitude) of the field contained in the aerial images. The identification of the location of the field contained in the aerial images enables obtaining images of the field linked with coordinate data.

Hereinafter, an example of processing executed by the location identifying device 100 will be described. First, prior to performing the processing by the location identifying device 100, a tractor mounted with a GNSS unit is made to move along edge parts of a target field to obtain location data of the edge parts surrounding the target field by using a navigation satellite (refer to FIG. 1). The location data obtained here is coordinate data containing longitude, latitude, and altitude in a map coordinate system (a global coordinate system commonly used in a GNSS).

To measure the location data by using the tractor, a positional relationship between the location measuring device using the GNSS, which is mounted on the tractor, and the outside part of the wheel (or crawler belt) of the tractor is preliminarily obtained. Thus, driving along the edges of the field enables providing the location data of the edges of the field. Additionally, a technique for controlling a tractor that is mounted with a camera so as to accurately move along edges of a field by using images may also be used.

In addition to the location measurement by the tractor, the target field is photographed by using the UAV (refer to FIG. 1). Here, the UAV is made to fly over a target field to take photographs of an area containing the target field, thereby obtaining aerial image data.

Figure 4:
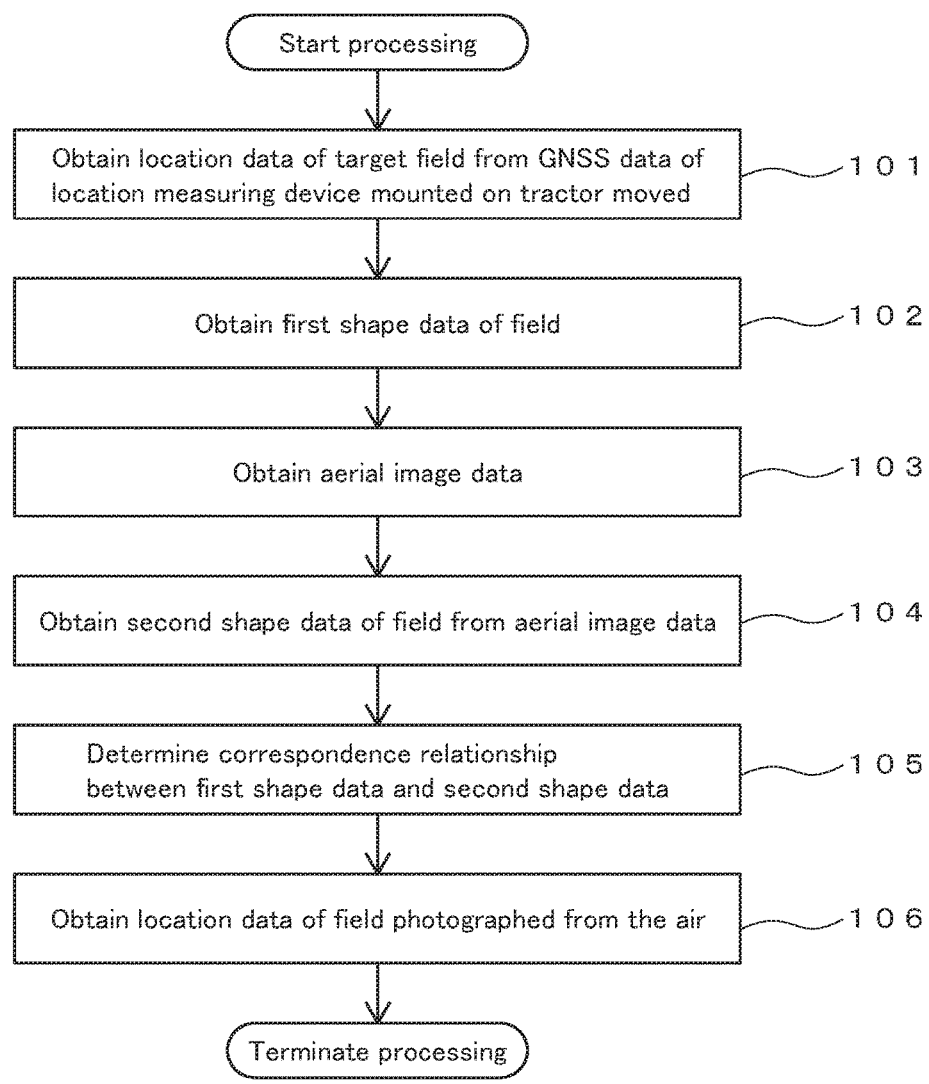
FIG. 4 is a flow chart showing an example of a processing procedure.

After the location data of the target field (location data of the edges of the target field) is obtained by using the tractor, and the aerial image data of the target field is obtained, the processing shown in FIG. 4 is performed by the location identifying device 100. FIG. 4 shows an example of a processing procedure performed by the location identifying device 100. Programs for executing the processing shown in FIG. 4 are stored in the storage of the location identifying device 100, a storage medium, a server on a network, or other means, in an appropriate manner, and they are read therefrom. This is the same as in the case of performing the processing in the flow chart shown in FIG. 6.

After the processing shown in FIG. 4 starts, the location data (location data of the edges of a target field) is obtained (step S101). The location data is measured by the location measuring device using the GNSS while the tractor mounted with the location measuring device moves along the edges of the target field. The data from the location measuring device using the GNSS mounted on the tractor is transferred to the location identifying device 100 via a storage medium or a communication channel in an appropriate manner.

Then, on the basis of the location data obtained in step S101, data of the shape of the target field is derived as first shape data (step S102). For example, in this processing, the shape (outline shape) of the target field is extracted from data of longitude and latitude at the edge (outline) parts of the target field. Specifically, data of the shape of the target field as seen from a direction vertical to the center (center of gravity) of the target field is generated from the location data of the outline of the target field. For example, for a square target field, square shape data is obtained as the first shape data. In the case of using location data of the movement path of the tractor, in which the above-described positional relationship is not taken into consideration, the first shape data is obtained on the basis of this location data although a measurement error of some degree is contained.

Next, data of aerial photographs taken from the UAV is obtained (step S103). The UAV has a camera unit that has a storage for electronic data (for example, a semiconductor memory), and the aerial image data is stored in this storage. The UAV is recovered after its flight is completed, and then the aerial image data in the storage is transferred to the location identifying device 100 via a storage medium or a communication channel in an appropriate manner.

The obtained aerial image data is used to detect the outline of the target field contained in the aerial images, and the shape of the target field of the area contained in the respective aerial images is obtained as second shape data (step S104). In this processing, a technique for extracting feature points from images, such that a difference in density is detected, is used to extract edge parts of the target field, and second shape data is obtained on the basis of the data of the edge parts. For example, for a square target field, square shape data is obtained as the second shape data. When multiple fields are contained in the aerial images, multiple second shape data corresponding to respective fields are obtained.

The second shape data may be modified (corrected) in accordance with a tilt of the UAV at the time of taking the aerial photograph, to contain a shape as downwardly seen from a vertical direction. The data of the tilt is obtained from data of the IMU mounted on the UAV. The modifying processing is performed by using projection conversion.

After step S104, the processing advances to step S105. In step S105, determining of a correspondence relationship between the first shape data and the second shape data (matching of the first shape data and the second shape data) is performed. For example, when there is only one second shape data, the shape contained in the second shape data is changed to search for a matching condition in which the second shape data and the first shape data match with each other. The matching condition in which the shape of the second shape data matches with the shape of the first shape data within an acceptable range is searched for. When the shape of the second shape data and the shape of the first shape data do not match with each other, the shape of the second shape data is changed again to search for the matching condition. When the matching condition within the acceptable range is not obtained, the processing fails.

When there are multiple second shape data (when multiple fields are contained in the aerial images), the matching degree of each of the second shape data is evaluated with respect to the first shape data. Among the multiple second shape data, the second shape data having the highest matching degree is selected as data corresponding to the first shape data.

Regarding the first shape data and the second shape data of which their correspondence relationship is determined, data of the part of the field contained in the aerial photograph corresponding to the second shape data (for example, image coordinate data) and coordinate values in the map coordinate system in the first shape data are matched with each other (step S106). As a result, data of the aerial images of the field is associated with information of the location data (longitude, latitude, and altitude) of the edge parts of the field in the map coordinate system.

Performing the processing until step S106 provides a correspondence relationship between the image data of the target field contained in the aerial images and the location data of the target field in the map coordinate system. That is, aerial image data of the field associated with coordinate information is obtained. For example, this aerial image data provides location information (longitude, latitude, and altitude) at a specific part in the image. In one case, the aerial image data may be used to perform ortho processing on the aerial image of the target field. The aerial image subjected to the ortho processing contains pixels, each of which coordinates are determined, and therefore, this image can be used to generate a growing map that indicates result of investigating growing conditions of agricultural crops in the field or can be used for other purposes.

The tractor may not be made to move along the edges of a field. Alternatively, for example, the tractor may be made to move along a predetermined path in a field while measuring location using a GNSS. An example shape of the predetermined path includes a linear shape, a curved shape, a polygonal shape, a circular shape, a zig-zag shape, a triangular wave shape, a rectangular wave shape, a sine wave shape, a spiral shape, and a shape using these shapes in combination. Note that the path of the movement of the tractor must remain in a field. The data of the movement path of the tractor measured by the GNSS is used as the first shape data.

In addition, the movement path of the tractor (track of the movement as ruts or other parts) is detected in the aerial images obtained from the UAV, by using an image recognizing technique. The shape of the movement path of the tractor detected in the aerial images is used as the second shape data. The subsequent processing is the same as in the processing shown in FIG. 4.

Figure 5:
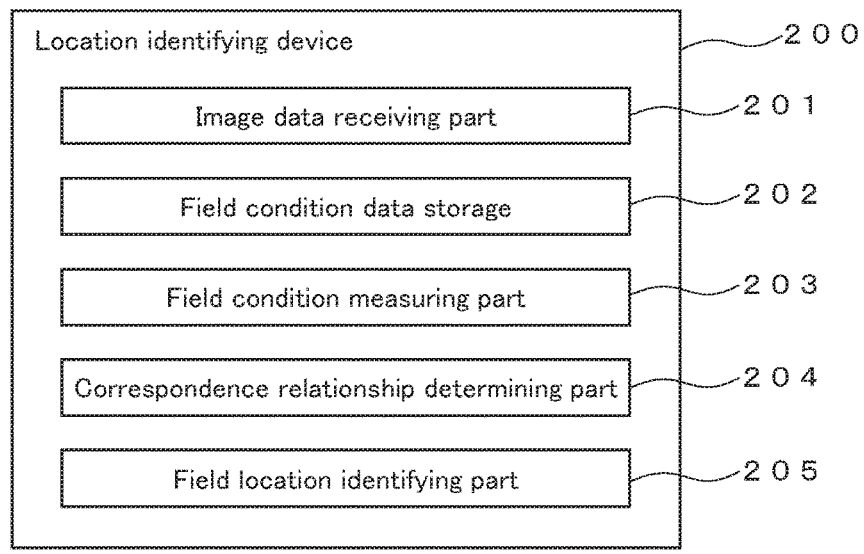
FIG. 5 is a block diagram of another location identifying device.

FIG. 5 shows a location identifying device 200 in accordance with a further embodiment. The location identifying device 200 includes an image data receiving part 201, a field condition data storage 202, a field condition measuring part 203, a correspondence relationship determining part 204, and a field location identifying part 205. The configuration manner of the location identifying device 200 is the same manner as in the case of the First Embodiment. This embodiment also uses a UAV mounted with a camera. The details of the UAV are the same as in the case of the First Embodiment. In this embodiment, however, the camera mounted on the UAV is a multispectral camera or a hyperspectral camera, which can obtain information of wavelength spectra of photographed images.

The image data receiving part 201 is the same as the image data receiving part 101 in FIG. 3. The field condition data storage 202 stores preliminarily obtained field condition data of at least one of soil and vegetation, which is associated with location data of the field.

The condition data of the soil includes a cultivated or uncultivated condition, a cultivation degree, a dispersed condition of fertilizer and water, and a ridged or unridged condition, and a ridging state (for example, a ridging width). The condition data of the vegetation includes kinds of agricultural crops, growing condition, color information, and density condition. The field condition is obtained during daily farm work, and this information is stored in the field condition data storage 202.

The field condition data storage 202 also stores a relationship between the condition data of the soil and the vegetation and the location data in the field. For example, to stepwise shift harvesting periods or to average the effects of variations in weather, a field may be sectioned into stripe-shaped areas, thereby allowing agricultural crops in these respective areas to grow differently from each other. In this case, the distribution of the conditions of the soil and the agricultural crops may be represented in a stripe pattern such as a bar code. This distribution data is stored in the field condition data storage 202.

Figure 7:
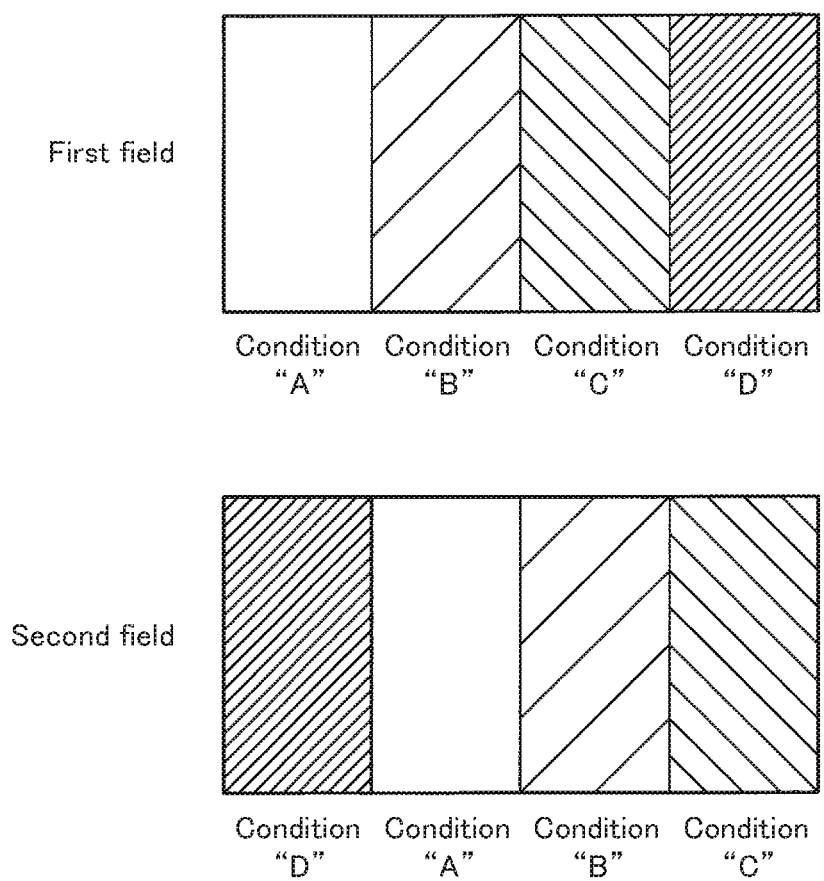
FIG. 7 is a conceptual diagram showing examples of field conditions.

FIG. 7 shows examples of a first field and a second field, which have different conditions from each other. Whether agricultural crops are planted and there are differences in growth of the agricultural crops, are recognized by seeing the images displayed on a display screen. This is because the images contain differences in size and color of the agricultural crops, conditions of being productive or being barren, and differences in size of products. The differences in the displayed images also appear in a difference in wavelength spectrum between an image containing the first field and an image containing the second field. Moreover, in the case in which there is a difference in the vegetation pattern of the fields as shown in FIG. 7, this difference is also detected. Furthermore, when the kinds of the agricultural crops differ, this difference is also determined from the difference in the wavelength spectrum.

Although the wavelength spectrum is selected here, data of color, texture, pattern, form, particle roughness, pattern density, combination of colors constituting patterns, or other parameters, may also be used. These parameters are surface characteristic data that characterizes the condition of the field, which is optically obtained. These data can be used alone, or one or more of these data can be used in combination, to characterize the condition of the field.

An example of the data relating to the condition of the field stored in the field condition data storage 202 includes data of soil and vegetation that are controlled to show conditions in stripe patterns as shown in FIG. 7. This data may include data of a set of conditions "A", "B", "C", and "D", for the first field. This data may also include data of a set of conditions "D", "A", "B", and "C", for the second field. These sets are used as specific information of the respective fields for discriminating the respective fields in the images. Additionally, relationships of the widths or the intervals in the stripes may also be used as the specific information.

The field condition measuring part 203 measures the condition of the soil or the vegetation of the target field from wavelength spectrum data of the aerial images. For example, untreated soils, fertilized soils, and cultivated soils differ from each other in color and particle texture in the displayed images. These differences appear in differences in wavelength spectra of the images. When the kinds and the growing conditions of the planted agricultural crops differ from each other, these differences also appear in wavelength spectra of photographed images of the planted agricultural crops. This function is used to measure the conditions of the soils and the kinds and the growing conditions of the agricultural crops in a target field.

Under conditions in which a wavelength spectrum of each treated condition of the soil and of each growing condition of respective agricultural crops is obtained and is stored in an appropriate storage as reference data in advance, the vegetation condition is determined by using wavelength spectrum data obtained by image analysis. An example of a technique for determining the vegetation condition using the wavelength spectrum may use normalized difference vegetation index (NDVI) data.

The correspondence relationship determining part 204 determines a correspondence relationship between the preliminarily obtained field condition data of at least one of the soil and the vegetation, which is stored in the field condition data storage 202, and the field condition data of at least one of the soil and the vegetation, which is measured by the field condition measuring part 203.

Hereinafter, an example of the processing performed by the correspondence relationship determining part 204 will be described. For example, it is assumed that the first field and the second field as shown in FIG. 7 in adjacent condition are contained in aerial images. The recent conditions and the locations of the fields are measured in advance (preferably, measured at a date and a time as close to the time of taking aerial images as possible), and this information is already stored in the field condition data storage 202 shown in FIG. 5.

The location information of the fields contained in the aerial images is not obvious at the time of taking the aerial images using the UAV. The approximate location of the photographed object can be determined by using the flight log data of the UAV. However, since the location data of the flight log contains measurement errors, the location data of each field is difficult to identify by using the flight log when multiple fields are contained in the aerial images.

In this example, the field condition measuring part 203 analyzes the aerial images to measure the conditions of the fields in the aerial images. As preparation, the field condition data storage 202 stores the condition of each field. Thus, the conditions of the fields obtained from the aerial image data are compared with the conditions of the fields stored in the field condition data storage 202 to obtain correspondence relationships therebetween. This processing is performed by the correspondence relationship determining part 204.

The field location identifying part 205 identifies the locations of the fields photographed from the air by referring to the correspondence relationship between the preliminarily obtained field condition data of at least one of the soil and the vegetation, which is stored in the field condition data storage 202, and the field condition data of at least one of the soil and the vegetation, which is measured by the field condition measuring part 203.

That is, the processing performed by the correspondence relationship determining part 204 provides a correspondence relationship between the field condition data obtained from the aerial image data and the field condition data preliminarily stored in the field condition data storage 202. In addition, the field condition data storage 202 stores the preliminarily obtained field condition data associated with the location information of the fields. Thus, the obtained correspondence relationship enables obtaining information of the locations (longitude, latitude, and altitude) of the fields detected as images in the aerial images. This processing is performed by the field location identifying part 205. The obtained location information of the fields contained in the aerial images enables obtaining data of the aerial images of the fields linked with coordinate information.

Figure 6:
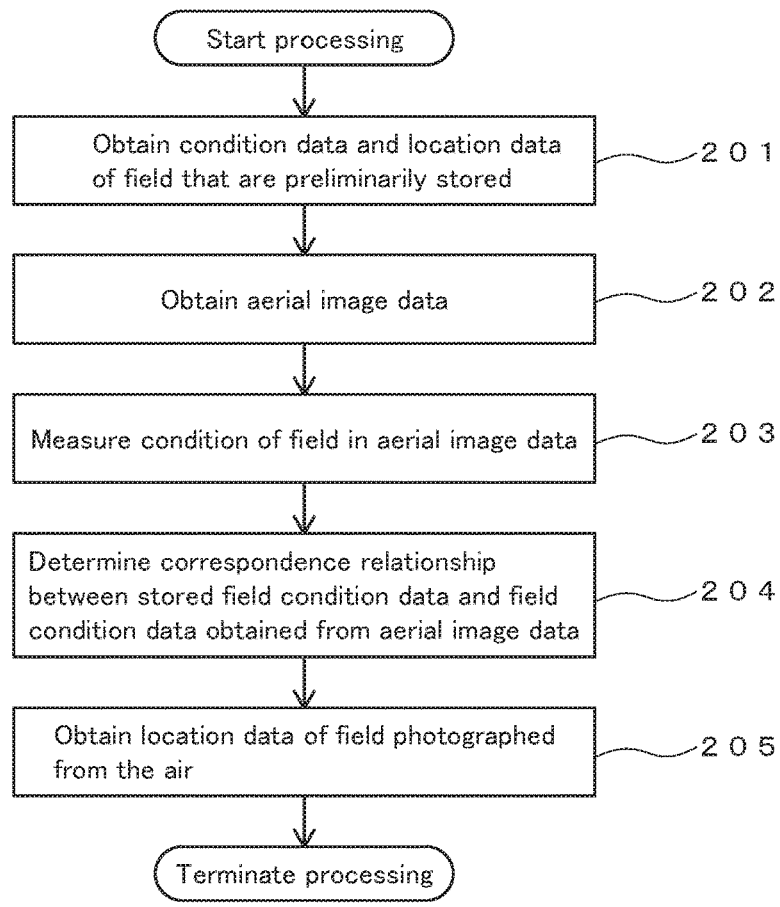
FIG. 6 is a flow chart showing an example of another processing procedure.

An example of a processing procedure performed by the location identifying device 200 is shown in FIG. 6. After the processing starts, the conditions and the location information of fields, which are preliminarily obtained, are retrieved from the field condition data storage 202 (step S201). This processing is performed by the image data receiving part 201. Then, data of images taken in the aerial photographing is obtained from the UAV (step S202). This processing is performed by the field condition data storage 202.

Next, the conditions of the fields are measured in the data of the images taken in the aerial photographing (step S203). This processing is performed by the field condition measuring part 203. Then, a correspondence relationship between the conditions of the fields read from the field condition data storage 202 and the conditions of the fields obtained from the aerial image data is determined (step S204). This processing is performed by the correspondence relationship determining part 204. On the basis of the content determined by the correspondence relationship determining part 204, the location of a target field is obtained (step S205). This processing is performed by the field location identifying part 205. Thus, aerial image data of the target field linked with coordinate information is obtained.

Another embodiment may be performed by using a combination of the techniques in the aforementioned embodiments. For example, as detailed above, when there are multiple fields that have the same shape and the same size, the matching technique of shapes may provide multiple candidates for a matched field, resulting in failure in identifying a target field. In such a case, soil information or vegetation information is further used as in the case detailed above to determine correspondence relationships between the fields in the images and the fields stored in the database.

In another example, in accordance with an embodiment, the matching between preliminarily obtained field condition data and field condition data obtained from aerial images may not be satisfactory because the preliminarily obtained field condition data is old. In such a case, the matching technique of shapes as described above is also used to obtain a correspondence relationship between the preliminarily obtained field condition data and the field condition data obtained from the aerial images.

In the case of using the aforementioned techniques in combination in the further embodiment, necessary functional parts are appropriately selected from among the hardware as shown in FIGS. 3 and 4, and a location identifying device including these selected functional parts is used.

In further embodiments, the location identifying device as shown in FIG. 3 or 5 may be located at a remote place separated from a target agricultural land. In this case, the location identifying device may perform the processing as shown in FIG. 4 or 6 by using necessary data that is transferred via an internet channel or other channel.

What is claimed is:

1. A location identifying device comprising:
an image data receiving part that receives data of a photographed image of a field taken from the air;
a location data receiving part that receives data of location of movement tracks left on a ground surface of the field by a tractor, the data of the location measured on the basis of navigation signals from a navigation satellite by a location measuring device while the tractor mounted with the location measuring device moves along a predetermined path set for the field;
a path detecting part that detects a shape of the predetermined path from the data of the photographed image by detecting the movement tracks left on the ground surface of the field by the tractor;
a correspondence relationship determining part that determines a correspondence relationship between the shape of the predetermined path detected by the path detecting part and the data of the location; and
a field location identifying part that identifies a location of the field contained in the photographed image by determining the shape of the predetermined path corresponding to the data of the location of the movement tracks, based on the determined correspondence relationship.

2. The location identifying device according to claim 1, wherein the correspondence relationship is determined by referring to a correspondence relationship between a condition of the field measured in the photographed image and a condition of the field preliminarily obtained.

3. The location identifying device according to claim 2, wherein the condition of the field includes a growing condition of agricultural crops that differs in each area of the field.

4. A location identifying device comprising:
- an image data receiving part that receives data of a photographed image of a field taken from the air, the field sectioned to include multiple areas in which at least one of a condition of soil and a condition of vegetation are different from each other;
- a field condition data storage that preliminarily stores data of specific information for identifying a combination of the multiple areas, in association with data of location of the field, the data of the specific information being generated by combining the condition of soil and the condition of vegetation in the multiple areas;
- a field condition measuring part that measures at least one of the condition of soil and the condition of vegetation of the field by using data of surface characteristics obtained from the photographed image;
- a correspondence relationship determining part that obtains a correspondence relationship between the data stored in the field condition data storage and data of at least one of the condition of soil and the condition of vegetation of the field, which is measured by the field condition measuring part; and
- a field location identifying part that identifies a location of the field that is photographed from the air, by referring to the obtained correspondence relationship.

5. The location identifying device according to claim 4, wherein the data of the surface characteristics contains at least one of data of wavelength spectrum, color, texture, pattern, and form.

6. The location identifying device according to claim 4, wherein the multiple areas have different conditions from each other, the field condition data storage stores the combination of the multiple areas, the field condition measuring part detects the combination of the multiple areas by using the data of the photographed image, and the correspondence relationship determining part determines a correspondence relationship between the combination of the multiple areas stored in the field condition data storage and the combination of the multiple areas detected by the field condition measuring part.

7. The location identifying device according to claim 4, wherein the multiple areas include multiple sites with vegetation that differ from each other, and the field condition measuring part detects identification information of the field corresponding to the respective vegetation of the multiple sites by using the data of the surface characteristics corresponding to the multiple areas obtained from the photographed image.

8. A location identifying method comprising:
- receiving data of a photographed image of a field taken from the air;
- receiving data of location of movement tracks left on a ground surface of the field by a tractor, the data of the location measured on the basis of navigation signals from a navigation satellite by a location measuring device while the tractor mounted with the location measuring device moves along a predetermined path set for the field;
- detecting a shape of the predetermined path from the data of the photographed image by detecting the movement tracks left on the ground surface of the field by the tractor;
- determining a correspondence relationship between the detected shape of the predetermined path and the data of the location; and
- identifying a location of the field contained in the photographed image by determining the shape of the predetermined path corresponding to the data of the location of the movement tracks, based on the determined correspondence relationship.

9. The location identifying device according to claim 4, wherein bar code data is generated by combining the condition of soil and the condition of vegetation in the multiple areas.

* * * * *